United States Patent
Shaga

(10) Patent No.: US 12,411,001 B2
(45) Date of Patent: Sep. 9, 2025

(54) TARGET FOR INDUCTIVE ANGULAR-POSITION SENSING

(71) Applicant: Microchip Technology Incorporated, Chandler, AZ (US)

(72) Inventor: Ganesh Shaga, Telangana (IN)

(73) Assignee: Microchip Technology Incorporated, Chandler, AZ (US)

( * ) Notice: Subject to any disclaimer, the term of this patent is extended or adjusted under 35 U.S.C. 154(b) by 258 days.

(21) Appl. No.: 18/194,448

(22) Filed: Mar. 31, 2023

(65) Prior Publication Data

US 2023/0314120 A1 Oct. 5, 2023

Related U.S. Application Data

(63) Continuation-in-part of application No. 18/048,627, filed on Oct. 21, 2022, now Pat. No. 12,203,780.

(30) Foreign Application Priority Data

Apr. 1, 2022 (IN) .............................. 202241019974
Aug. 26, 2022 (IN) .............................. 202241048671

(51) Int. Cl.
*G01B 7/30* (2006.01)
*G01D 5/20* (2006.01)

(52) U.S. Cl.
CPC ................. *G01B 7/30* (2013.01); *G01D 5/20* (2013.01)

(58) Field of Classification Search
CPC .... G01D 5/202; G01R 33/00; G01R 33/0035; G01R 33/0023; G01R 33/0017;
(Continued)

(56) References Cited

U.S. PATENT DOCUMENTS

| | | |
|---|---|---|
| 1,639,044 A | 8/1927 | Mansbridge |
| 3,197,763 A | 7/1965 | Fisher |

(Continued)

FOREIGN PATENT DOCUMENTS

| | | |
|---|---|---|
| CN | 106255889 A | 12/2016 |
| CN | 108351224 A | 7/2018 |

(Continued)

OTHER PUBLICATIONS

"A Revolution in Sensing: World's First Inductance-to-Digital Converter", LDC1000 Inductive Sensing Brochure, Texas Instruments, 2013, pp. 1-6, Almaden Press, San Jose, CA.

(Continued)

*Primary Examiner* — Lee E Rodak
*Assistant Examiner* — Taqi R Nasir
(74) *Attorney, Agent, or Firm* — TraskBritt

(57) ABSTRACT

Various examples include a target for inductive angular-position sensing and an inductive angular-position sensor including the same. The target has a target body comprising an inner circular ring around a center axis, and multiple fins formed with and extending radially from portions of the inner circular ring and equally radially spaced around the center axis. Respective ones of the multiple fins are formed as an arc band-shaped ring. In one or more examples, the respective ones of the multiple fins formed as the arc band-shaped ring provide a current path for an eddy current for the inductive angular-position sensing.

28 Claims, 9 Drawing Sheets

(58) Field of Classification Search
CPC ............ G01R 31/3191; G01R 33/0358; G01R 33/0356; G01B 7/004; G01C 17/38; G06F 3/017; G06F 3/0346; G06F 3/012; H01L 39/223
See application file for complete search history.

(56) References Cited

U.S. PATENT DOCUMENTS

| | | | |
|---|---|---|---|
| 3,281,826 A | 10/1966 | Moffitt | |
| 4,223,300 A | 9/1980 | Wiklund | |
| 4,356,732 A * | 11/1982 | Hachtel | G01L 3/105 |
| | | | 73/862.331 |
| 4,737,698 A | 4/1988 | McMullin et al. | |
| 4,847,548 A | 7/1989 | Lafler | |
| 4,853,604 A | 8/1989 | McMullin et al. | |
| 5,061,896 A | 10/1991 | Schmidt | |
| 5,239,288 A | 8/1993 | Tsals | |
| 6,111,402 A | 8/2000 | Fischer | |
| 6,236,199 B1 | 5/2001 | Irle et al. | |
| 6,239,571 B1 | 5/2001 | Shimahara | |
| 6,255,810 B1 | 7/2001 | Irle et al. | |
| 6,304,014 B1 | 10/2001 | England et al. | |
| 6,304,076 B1 | 10/2001 | Madni et al. | |
| 6,384,598 B1 | 5/2002 | Hobein et al. | |
| 6,522,128 B1 | 2/2003 | Ely et al. | |
| 6,591,217 B1 | 7/2003 | Baur et al. | |
| 6,593,730 B2 | 7/2003 | Zapf | |
| 6,605,940 B1 | 8/2003 | Tabrizi et al. | |
| 7,276,897 B2 | 10/2007 | Lee | |
| 7,385,389 B2 | 6/2008 | Tahara et al. | |
| 7,719,264 B2 | 5/2010 | Tiemann | |
| 7,726,208 B2 | 6/2010 | Hoeller et al. | |
| 7,821,256 B2 | 10/2010 | Lee | |
| 7,906,960 B2 | 3/2011 | Lee | |
| 8,278,911 B2 | 10/2012 | Tiemann et al. | |
| 8,339,126 B2 | 12/2012 | Zak et al. | |
| 8,345,438 B2 | 1/2013 | Mi et al. | |
| 8,451,000 B2 | 5/2013 | Tiemann | |
| 8,482,894 B2 | 7/2013 | Yra et al. | |
| 8,508,242 B2 | 8/2013 | Shao et al. | |
| 8,618,791 B2 | 12/2013 | Grinberg et al. | |
| 8,947,077 B2 | 2/2015 | Lee et al. | |
| 8,988,066 B2 | 3/2015 | Shao et al. | |
| 9,234,771 B2 | 1/2016 | Sasaki | |
| 9,300,022 B2 | 3/2016 | Vaisman | |
| 9,322,636 B2 | 4/2016 | Fontanet | |
| 9,528,858 B2 | 12/2016 | Bertin | |
| 9,677,913 B2 | 6/2017 | Wang et al. | |
| 9,929,651 B2 | 3/2018 | Cannankurichi et al. | |
| 10,415,952 B2 | 9/2019 | Reddy et al. | |
| 10,444,037 B2 | 10/2019 | Bertin | |
| 10,760,928 B1 | 9/2020 | Shaga et al. | |
| 10,761,549 B2 | 9/2020 | Sasmal et al. | |
| 10,837,847 B2 | 11/2020 | Smith, Jr. | |
| 10,884,037 B2 | 1/2021 | Chellamuthu et al. | |
| 10,921,155 B2 | 2/2021 | Shaga et al. | |
| 2001/0001430 A1 | 5/2001 | Ely et al. | |
| 2002/0000129 A1 | 1/2002 | Madni et al. | |
| 2002/0097042 A1 | 7/2002 | Kawate et al. | |
| 2003/0062889 A1 | 4/2003 | Ely et al. | |
| 2003/0067941 A1 | 4/2003 | Fall | |
| 2003/0206007 A1 | 11/2003 | Gass et al. | |
| 2004/0065533 A1 | 4/2004 | Schwesig et al. | |
| 2004/0080313 A1 | 4/2004 | Brosh | |
| 2004/0081313 A1 | 4/2004 | McKnight et al. | |
| 2004/0182602 A1 | 9/2004 | Satoh et al. | |
| 2006/0038635 A1 | 2/2006 | Richiuso et al. | |
| 2006/0119351 A1 | 6/2006 | James et al. | |
| 2006/0125472 A1 | 6/2006 | Howard et al. | |
| 2007/0001666 A1 | 1/2007 | Lee | |
| 2008/0054887 A1 | 3/2008 | Lee | |
| 2008/0164869 A1 | 7/2008 | Bach et al. | |
| 2008/0174302 A1 | 7/2008 | Lee et al. | |
| 2008/0176530 A1 | 7/2008 | Kuhn et al. | |
| 2008/0238416 A1 | 10/2008 | Shiraga et al. | |
| 2009/0079422 A1 | 3/2009 | Lee | |
| 2010/0271012 A1 | 10/2010 | Patterson et al. | |
| 2011/0101968 A1 | 5/2011 | Brands et al. | |
| 2012/0081106 A1 | 4/2012 | Grinberg et al. | |
| 2012/0175198 A1 | 7/2012 | Thibault et al. | |
| 2012/0242304 A1 | 9/2012 | Yra et al. | |
| 2012/0242352 A1 | 9/2012 | Gong et al. | |
| 2012/0244802 A1 | 9/2012 | Feng et al. | |
| 2013/0021023 A1 | 1/2013 | Niwa et al. | |
| 2013/0257417 A1 | 10/2013 | Ely | |
| 2013/0289826 A1 | 10/2013 | Yoshitake et al. | |
| 2015/0233695 A1 | 8/2015 | Gomes et al. | |
| 2015/0323348 A1 | 11/2015 | Liu et al. | |
| 2015/0323349 A1 | 11/2015 | Has et al. | |
| 2016/0099301 A1 | 4/2016 | Yen et al. | |
| 2016/0214648 A1 | 7/2016 | Schoepe et al. | |
| 2017/0141685 A1 | 5/2017 | Cannankurichi et al. | |
| 2017/0158231 A1 | 6/2017 | Farrelly | |
| 2017/0166251 A1 | 6/2017 | Shao et al. | |
| 2018/0040413 A1 | 2/2018 | Yen et al. | |
| 2018/0120083 A1 | 5/2018 | Reddy et al. | |
| 2018/0196453 A1 | 7/2018 | Sasmal et al. | |
| 2018/0224301 A1 | 8/2018 | Herrmann et al. | |
| 2018/0274591 A1 | 9/2018 | Maniouloux et al. | |
| 2018/0274948 A1 | 9/2018 | Maniouloux et al. | |
| 2019/0009903 A1 | 1/2019 | Chan et al. | |
| 2019/0017845 A1 | 1/2019 | Utermoehlen et al. | |
| 2019/0063956 A1 | 2/2019 | Bertin | |
| 2019/0094047 A1 | 3/2019 | Utermoehlen et al. | |
| 2019/0186891 A1 | 6/2019 | Utermoehlen et al. | |
| 2019/0195963 A1 | 6/2019 | Qama | |
| 2019/0226828 A1 | 7/2019 | Lugani et al. | |
| 2019/0242725 A1 | 8/2019 | Shaga et al. | |
| 2019/0326501 A1 | 10/2019 | Gilbert et al. | |
| 2019/0331541 A1 | 10/2019 | Janisch et al. | |
| 2019/0360839 A1 | 11/2019 | Shao | |
| 2020/0088549 A1* | 3/2020 | Shao | G01D 5/202 |
| 2020/0200569 A1 | 6/2020 | Utermoehlen et al. | |
| 2021/0063206 A1* | 3/2021 | Ausserlechner | G01B 7/30 |
| 2021/0080243 A1 | 3/2021 | Ocket et al. | |
| 2021/0098187 A1 | 4/2021 | Kumar et al. | |
| 2021/0255657 A1 | 8/2021 | Miller et al. | |
| 2021/0372823 A1 | 12/2021 | Witts et al. | |
| 2022/0034684 A1 | 2/2022 | Le Goff et al. | |
| 2022/0155050 A1 | 5/2022 | Gillet et al. | |
| 2023/0175869 A1 | 6/2023 | Leonard | |

FOREIGN PATENT DOCUMENTS

| | | |
|---|---|---|
| CN | 112272755 A | 1/2021 |
| CN | 112484621 A | 3/2021 |
| DE | 4021637 A1 | 1/1992 |
| DE | 10120822 A1 | 4/2002 |
| DE | 102015220615 A1 | 4/2017 |
| DE | 102019207070 A1 | 11/2020 |
| EP | 0467514 A2 | 1/1992 |
| EP | 0845659 A2 | 6/1998 |
| EP | 1914520 A2 | 4/2008 |
| EP | 2145158 A2 | 1/2010 |
| EP | 2044389 B1 | 4/2010 |
| EP | 3245485 A1 | 11/2017 |
| EP | 3865825 A1 | 8/2021 |
| FR | 2304900 A1 | 10/1976 |
| GB | 1502697 A | 3/1978 |
| GB | 2394293 A | 4/2004 |
| JP | 3839449 B2 | 11/2006 |
| JP | 2021-025851 A | 2/2021 |
| WO | 2008/125853 A1 | 10/2008 |
| WO | 2008/139216 A2 | 11/2008 |
| WO | 2016/079465 A1 | 5/2016 |
| WO | 2017/100515 A1 | 6/2017 |
| WO | 2018/108783 A2 | 6/2018 |
| WO | 2019/152092 A1 | 8/2019 |
| WO | 2021/239175 A1 | 12/2021 |

(56) References Cited

OTHER PUBLICATIONS

"Inductive Sensor Coil Design Using LX3301A", AN-S1412 Application Note, Microsemi Corporate Headquarters, One Enterprise, Aliso Viejo, CA 92656 USA, Nov. 2017.
Application of Indian Application Serial No. 202021054245 on file with the Indian Patent Office (not yet published).
Disclosure of U.S. Appl. No. 62/990,403.
Microchip Technology Inc., "Inductive Sensor Interface IC with Embedded MCU", Summary Data Sheet LX3302A, DS20006496A (Feb. 2020) 48 pages.
Microchip Technology Inc., "Robust, Low-Cost and Noise-Immune Motion-Sensing Inductive Sensors", Automotive brochure, DS00002864A, www.microchip.com/automotive (Dec. 2018) 2 pages.
Song et al., "Simulations of Nonuniform Behaviors of Multiple No-Insulation (RE)Ba2Cu3O7-x HTS Pancake Coils During Charging and Discharging", IEEE Transactions on Applied Superconductivity, vol. 26, No. 4, (Jun. 2016) 5 pages.
Second Office Action and Search Report of Chinese Patent Application No. 202180096199.0, issued Oct. 29, 2024, 12 pages with English translation.
First Office Action and Search Report of Chinese Patent Application No. 202180096199.0, issued May 8, 2024, 32 pages with English translation.
International Search Report and Written Opinion of the International Searching Authority of International Application No. PCT/US2019/044245, dated Nov. 15, 2019, 10 pages.
International Search Report for International Application No. PCT/US2022/078524, mailed Apr. 11, 2023, 7 pages.
International Search Report for International Application No. PCT/US2023/065238, mailed Jul. 3, 2023, 6 pages.
International Written Opinion for International Application No. PCT/US2022/078524, mailed Apr. 11, 2023, 14 pages.
International Written Opinion for International Application No. PCT/US2023/065238, mailed Jul. 3, 2023, 9 pages.
Written Opinion of the International Search Authority of International Application No. PCT/US2019/042895, dated Oct. 21, 2019, 8 pages.

* cited by examiner

TARGET FOR INDUCTIVE ANGULAR-POSITION SENSING

CROSS-REFERENCE TO RELATED APPLICATIONS

This application claims the benefit of the priority date of Indian Provisional Patent Application No. 202241019974, filed Apr. 1, 2022, and titled "INDUCTIVE ANGULAR-POSITION SENSOR, AND RELATED DEVICES, SYSTEMS, AND METHODS," and Indian Provisional Patent Application No. 202241048671, filed Aug. 26, 2022, and titled "INDUCTIVE ANGULAR-POSITION SENSOR, AND RELATED DEVICES, SYSTEMS, AND METHODS," and is a continuation-in-part of U.S. patent application Ser. No. 18/048,627, filed Oct. 21, 2022, now U.S. Pat. No. 12,203,780, issued Jan. 21, 2025, and titled "TARGET FOR AN INDUCTIVE ANGULAR-POSITION SENSOR," the disclosure of each of which is incorporated herein in its entirety by this reference.

FIELD

This description relates, generally, to inductive angular-position sensing. More specifically, some examples relate to a target for inductive angular-position sensing, without limitation. Additionally, devices, systems, and methods are disclosed.

BACKGROUND

If a coil of wire is placed in a changing magnetic field, a voltage will be induced at ends of the coil of wire. In a predictably changing magnetic field, the induced voltage will be predictable (based on factors including the area of the coil affected by the magnetic field and the degree of change of the magnetic field). It is possible to disturb a predictably changing magnetic field and measure a resulting change in the voltage induced in the coil of wire. Further, it is possible to create a sensor that measures movement of a disturber, e.g., a target, of a predictably changing magnetic field based on a change in a voltage induced in one or more coils of wire.

BRIEF DESCRIPTION THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

DETAILED DESCRIPTION

Figure 1A:
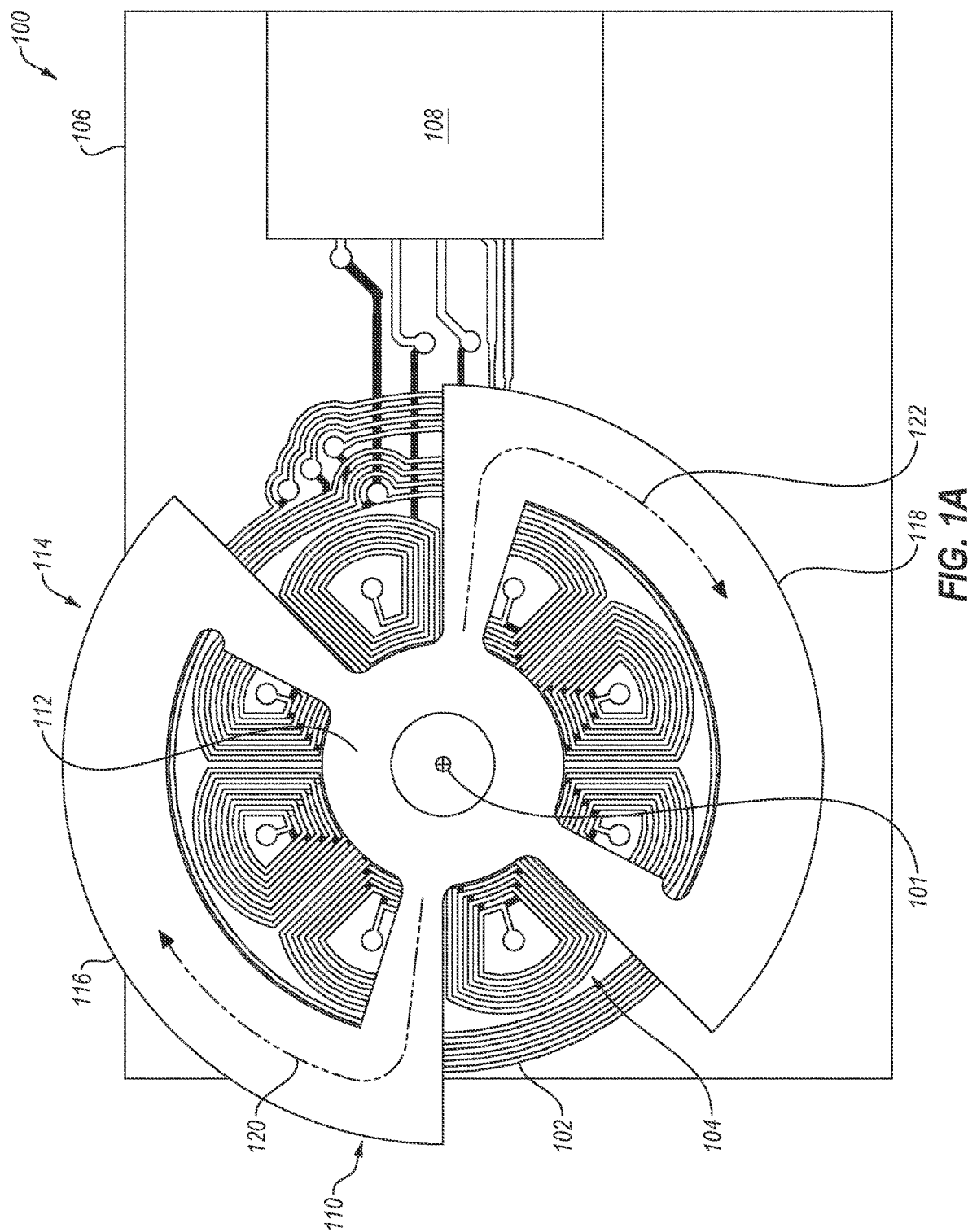
FIG. 1A is a top view of an apparatus which may be, or include, an inductive position sensor according to one or more examples.

In the following detailed description, reference is made to the accompanying drawings, which form a part hereof, and in which are shown, by way of illustration, specific examples in which the present disclosure may be practiced. These examples are described in sufficient detail to enable a person of ordinary skill in the art to practice the present disclosure. However, other examples may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawing could be arranged and designed in a wide variety of different configurations. Thus, the following description of various examples is not intended to limit the scope of the present disclosure, but is merely representative of various examples. While the various aspects of the examples may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be depicted by block diagram form in order not to obscure the present disclosure in unnecessary detail. Conversely, specific implementations shown and described are only examples and should not be construed as the only way to implement the present disclosure unless specified otherwise herein. Additionally, block definitions and partitioning of logic between various blocks is an example of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, and symbols that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal. A person having ordinary skill in the art would appreciate that this disclosure encompasses communication of quantum information and qubits used to represent quantum information.

The various illustrative logical blocks, modules, and circuits described in connection with the examples disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer executes computing instructions (e.g., software code, without limitation) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

An inductive angular-position sensor may include, one or more excitation coils, a first sense coil, a second sense coil, a target, and an integrated circuit including an oscillator to drive the excitation coil and electronic circuits to receive and demodulate respective outputs of the first and second sense coils. Such an inductive angular-position sensor may determine an angular-position of the target relative to the one or more excitation coils or the sense coils.

The oscillator may generate an excitation signal. The one or more excitation coils may be excited by the excitation signal. The oscillating signal on the one or more excitation coils may generate a changing (oscillating) magnetic field near and especially within a space encircled by the excitation coil, although not limited thereto.

The changing magnetic field generated by the one or more excitation coils may induce a first oscillating voltage at ends of the first sense coil and a second oscillating voltage at ends of the second sense coil. The first oscillating voltage at the ends of the first sense coil may oscillate in response to the oscillation of the excitation signal and may be a first sense signal. The second oscillating voltage at the ends of the second sense signal may oscillate in response to the oscillation of the excitation signal and may be a second sense signal.

The target may be positioned relative to the one or more excitation coils, the first sense coil, and the second sense coil. For example, the target, or a portion of the target, may be positioned above, or beneath, a portion of the one or more excitation coils, the first sense coil, and the second sense coil, without limitation. The target may disrupt some of the changing magnetic field that passes through one or more loops of the first sense coil and the second sense coil.

The location of the target, or the portion of the target, above or beneath the one or more excitation coils, the first sense coil, and the second sense coil may affect the first sense signal and the second sense signal induced in the first sense coil and the second sense coil, respectively. For example, the target may disrupt magnetic coupling between the one or more excitation coils and the first and second sense coils. Such disruption may affect a magnitude of the first and second sense signals induced in the first and second sense coils, respectively. For example, in response to the target, or a portion of the target, being over a loop in the first sense coil, the amplitude of the first sense signal may be less than the amplitude of the first sense signal when the target is not over the loop in the first sense coil.

Further, the target may rotate (e.g., around an axis, without limitation) such that a portion of the target may pass over, or under, one or more loops of one or more of the first sense coil and the second sense coil and/or over, or under, portions of the one or more excitation coils that are proximate to loops of the first and the second sense coils. As the target rotates, the first sense signal of the first sense coil and the second sense signal of the second sense coil may be amplitude modulated in response to the rotation of the target and in response to the portion of the target passing over, or under, the loops of the first and the second sense coils and/or over or under portions of the one or more excitation coils proximate to the loops of the first and the second sense coils.

In one or more examples, the integrated circuit may generate an output signal responsive to the first sense signal and the second sense signal. The output signal may be a fraction of a rail voltage, or a digital signal, based on the first sense signal and the second sense signal. The output signal may be related to an angular-position of the target, or the position of the portion of the target, and successive samples of the output signal may be related to a direction of movement of the target. Thus, the inductive angular-position sensor may generate an output signal indicative of an angular-position of a target.

In one or more examples, the integrated circuit may generate a first output signal based on the first sense signal and a second output signal based on the second sense signal.

The first output signal may be the first sense signal demodulated; the second output signal may be the second sense signal demodulated. Together, the two output signals may be related to an angular-position of the target and subsequent samples of the first and second output signals may be indicative of rotation of the target.

In one or more examples, the integrated circuit may generate a single output signal based on the first sense signal and the second sense signal. As a non-limiting example, the integrated circuit may generate the single output signal based on a relationship (e.g., an arctangent, without limitation) of the first sense signal and the second sense signal.

A shape of the target and shapes of the sense coils may determine how coupling between the one or more excitation coils and the sense coils changes as the target rotates. A target that covers an area encircled by lobes of the sense coils that change following a sinusoidal pattern may allow the sensor to produce more accurate results. For example, if an area encircled by a sense coil, and covered by a target, is mapped as a function of target rotation, an area that follows a sinusoidal curve as a function of rotation angle may allow a sensor incorporating the sense coil and the target to produce accurate position results, e.g., more accurate than other sense coils and other targets.

Various examples may include targets or sense coils having shapes that may cause sense signals from the respective sense coils to exhibit desirable waveform shapes. The shapes of targets or path portions of the sense coils may be related to how the sense signals generated therein are amplitude modulated as the target disrupts the magnetic field between the one or more excitation coils and the sense coils. As a non-limiting example, as the target rotates above, or under, the first and second sense coils (and/or above, or under, the one or more excitation coils) and disrupts the magnetic field between the one or more excitation coils and the first and second sense coils, the shape of the target and the shape of the path portion of the first and second sense coils may determine the shape of an amplitude-modulation envelope exhibited by the sense signals.

As a non-limiting example, an amplitude-modulation envelope of sense signals of sense coils of various examples may be close to a sinusoidal shape. A sinusoidally shaped amplitude-modulation envelope may be well-suited for translation into an angular-position, e.g., through a trigonometric function, e.g., arctangent, without limitation.

Some examples include targets and/or sense coils that cause the integrated circuit to generate a constant-slope output signal in response to rotation of the target, relative to the sense coils. The constant-slope output signal may be an output signal with a known correlation (e.g., a linear relationship, without limitation) between an amplitude of the output signal and the angular-position of the target.

One or more examples of the present disclosure may include elements of inductive angular-position sensors (including, e.g., sense coils and targets, without limitation) which may allow such inductive angular-position sensors to provide a more accurate correlation between output signals and the angular-position of the target relative to the sense coils. In other words, one or more examples of the present disclosure may include elements for inductive angular-position sensors that may cause the inductive angular-position sensors to be more accurate than other inductive angular-position sensors. Additionally or alternatively, one or more examples may include inductive angular-position sensors that are more accurate than other inductive angular-position sensors.

Various example targets and sense coils may reduce the cost of targets by reducing the size of targets (e.g., while still producing sense signals having similar amplitudes to other sensors including other targets or amplitudes that are within an operational threshold of the sensor, without limitation). Further reducing the size of targets may reduce the weight of the targets. Reducing the weight of targets may save energy in systems that use the sensors e.g., because a rotor coupled to a target will have less rotational inertia by reason of the target being lighter.

Additionally or alternatively, various example targets or sense coils may increase sensitivity of sensors by increasing a degree to which magnetic coupling between excitation coils and sense coils is disrupted by targets.

Additionally or alternatively, various example targets or sense coils may allow sensors to include a larger air gap than other sensors. For example, various examples may allow sensors to have greater manufacturing tolerances or design tolerances. As a non-limiting example, as a result of the increased sensitivity of sensors (e.g., based on increased disruption of magnetic coupling by targets, without limitation) a target may be positioned farther away from sense coils or the excitation coil than other targets of other inductive angular-position sensors and may yet produce sense signals exhibiting similar magnitudes of amplitude modulation as the other inductive angular-position sensors.

In the present disclosure, references to things (including sense coils, excitation coils, and paths, without limitation) being "at," "in," "on," "arranged at," "arranged in," "arranged on" and like terms may refer to the things being arranged substantially within or on a surface of the support structure. As a non-limiting example, sense coils may include conductive lines in one or more planes (e.g., layers) of a printed circuit board (PCB), with the PCB being the support structure. Thus, a sense coil arranged at a support structure may include conductive lines in multiple layers within the support structure.

In the present disclosure, references to a target being "above," "over," "beneath," or "under" sense coils or excitation coils may indicate that the target may be positioned relative to the sense coils or excitation coils in an example orientation. The relative position of the target may be such that the target disrupts magnetic field between the excitation coils and the sense coils. The orientation of may be changeable e.g., as an inductive angular-position sensor including the target is moved. A target positioned "above," "over," "beneath," or "under" sense coils or excitation coils may disrupt magnetic coupling between the sense coils and the excitation coils.

Sensors can be used for rotor position sensing of motors where sensors are mounted inside the assembly, among other things. Various examples may be applicable in targeting applications for through-shaft sensors with low-form-factor PCBs. However, examples disclosed herein are not limited to rotor sensing.

Example targets described and illustrated herein include a target that may be utilized with an angular inductive position sensor to generate a predetermined number of repetitive sensor output signals with each full rotation of the target.

Example sensors described and illustrated herein include four-pole pair sensors for complete 360° rotation of a target which may generate four repetitive sensor output signals over the complete 360° rotation of the target. In other words, a 360° rotation of the target may result in four cycles of a position output signal or four cycles of sense signals. However, this disclosure is not limited to sensors (or targets) that have specific numbers of "lobes" or "poles." In other examples other numbers of poles or lobes may be used. For example, a three-pole sensor, a five-pole sensor, or a six-pole sensor, without limitation, may be used.

FIG. 1A is a top view of an apparatus 100 according to one or more examples. Apparatus 100 may be, or include, an inductive angular-position sensor. Apparatus 100 may include an excitation coil 102, sense coils 104, and a target 110. Excitation coil 102 and sense coils 104 may be laid out as conductive traces on a support structure, or a substrate 106, such as a PCB. Apparatus 100 may also include processing circuitry 108 for inductive position sensing of target 110 using excitation coil 102 and sense coils 104. At least some of processing circuitry 108 may be packaged in an integrated circuit.

Excitation coil 102 may be referred to as a primary coil or an oscillator coil, and sense coils 104 may be referred to as secondary coils. Sense coils 104 may include respective radially symmetric lobes evenly arranged around a center axis 101. Excitation coil 102 may have a circular winding pattern arranged around sense coils 104 and center axis 101. In one or more examples, respective lobes of sense coils 104 have a keystone shape as shown in FIG. 1A; however, any suitable lobe shape may be implemented as an alternative, such as the lobe shape shown later in relation to FIG. 3A.

Target 110 has a target body which is generally planar (i.e., in-plane with the page). The target body of target 110 may be made of a conductive material, such as a non-magnetic conductive metal or metal alloy, without limitation. In one or more examples, the non-magnetic conductive metal or metal alloy may be or include copper or aluminum. In one or more other examples, the target body of target 110 may be made of a magnetic conductive metal or metal alloy, such as carbon steel or ferritic stainless steel, without limitation. Here, the oscillator may generate an excitation signal within a certain range of frequencies (e.g., 1-6 MHz, without limitation) that the magnetic domains of the magnetic conductive metals or metal alloys will not react to.

When in operational use, target 110 rotates around center axis 101. Target 110 may disrupt magnetic coupling between excitation coil 102 and sense coils 104, such that sense signals induced in sense coils 104 are indicative of an angular-position of target 110 as it rotates around center axis 101. The degree to which target 110 disrupts magnetic coupling between excitation coil 102 and sense coils 104 may vary at least partially in response to changes in the angular-position of target 110.

In one or more examples, the generally planar body of target 110 has an inner circular ring 112 around center axis 101, and multiple fins 114 (e.g., fins 116 and 118) formed with and extending radially from portions of inner circular ring 112 and equally radially spaced around center axis 101. In one or more examples of FIG. 1A, the number of fins 114 of the target body is two (2). In one or more examples, fins 116 and 118 are equally radially spaced around inner circular ring 112, and about center axis 101, at 180° intervals. Note that the symbol "°" is used herein to represent "degree" and "degrees," which are a measurement of a plane angle in which a full rotation is 360 degrees.

Figure 1C:
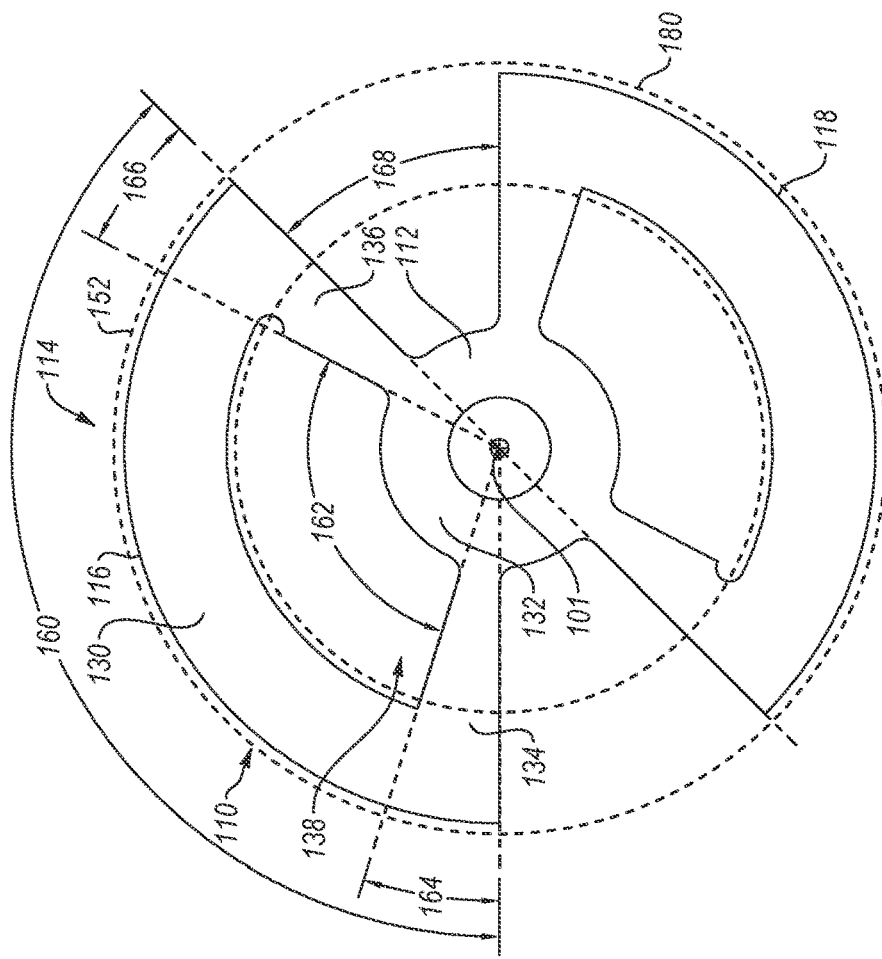
FIGS. 1B and 1C are depictions of a target of the apparatus of FIG. 1A according to one or more examples.
Figure 1B:
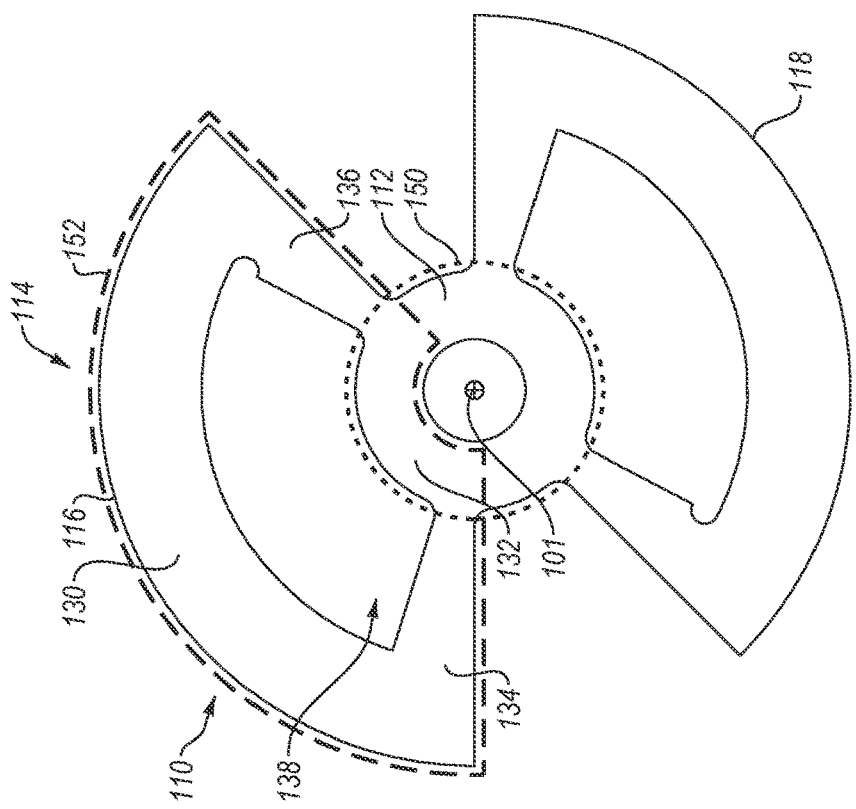

FIGS. 1B and 1C depict target 110 of FIG. 1A separated from the rest of angular-position sensor. As illustrated, respective fins 114 are formed as a semi-circular, arc band-shaped ring (i.e., together with respective portions of inner circular ring 112). An arc band-shaped ring may be characterized as a semi-circular, arc band having a semi-circular, arc band-shaped opening 138 or "cut-out." In FIG. 1B, a dashed line outline 152 surrounding fin 116 is provided to designate fin 116 formed as the arc band-shaped ring. A dotted line outline 150 surrounding inner circular ring 112 is provided to designate inner circular ring 112, a portion of which is formed with the arc band-shaped ring of fin 116.

In FIG. 1B, respective fins 114 formed as the arc band-shaped ring have an outer-circumferential portion and an inner-circumferential portion, where the inner-circumferential portion is formed as part of inner circular ring 112. For example, fin 116 has an outer-circumferential portion 130 and an inner-circumferential portion 132, where inner-circumferential portion 132 is formed as part of inner circular ring 112. As respective fins 114 are formed as an arc band-shaped ring, consequently, respective ones of the outer-circumferential portions have the shape of a semi-circular arc band, and respective ones of the inner-circumferential portions (e.g., portions of inner circular ring 112) have the shape of a (relatively shorter) semi-circular arc band.

In addition, respective fins 114 formed as the arc band-shaped ring have a respective left-side radial edge portion and a right-side radial edge portion, where the left-side and right-side radial edge portions connect between or bridge the inner-circumferential portion and the outer-circumferential portion. For example, fin 116 has a left-side radial edge portion 134 and a right-side radial edge portion 136, where left-side and right-side radial edge portions 134 and 136 connect between or bridge inner-circumferential portion 132 and outer-circumferential portion 130.

Left-side and right-side radial edge portions 134 and 136 may be characterized as (e.g., relatively narrow) "radial edge fins" which extend from inner circular ring 112 and connect with outer-circumferential portion 130. In total, the total number of radial edge fins of target 110 of FIG. 1B is four (4) (e.g., 2 radial edge fins per fin, with 2 fins=4 radial edge fins).

Given such a configuration, respective fins 114 formed as the arc band-shaped ring respectively form a loop to provide a current path for an eddy current for angular-position sensing. With reference back to FIG. 1A, fin 116 is indicated to provide a current path 120 for eddy current and fin 118 is indicated to provide a current path 122 for eddy current.

With reference to FIG. 1C, the outer-circumferential portions of the multiple fins 114 that are equally radially spaced around inner circular ring 112 together define a discontinuous outer circular ring 180. In one or more examples, the outer-circumferential portions of the multiple fins 114 together define discontinuous outer circular ring 180 which is about 75% of a full outer circular ring (or about 270° out of) 360°. In this context, "about 75%" includes 75% plus or minus 3%, inclusive.

Respective arc band-shaped rings of fins 114 are defined by, or along, boundaries of an angle 160 having an apex at center axis 101 of the target 110. In one or more examples, the angle 160 is about 135°. In this context, "about 135°" includes 135° plus or minus 5°, inclusive.

In addition, respective arc band-shaped openings (e.g., arc band-shaped opening 138 of fin 116) in fins 114 are defined by or along boundaries of an angle 162 having an apex at center axis 101 of the target 110, bordered by a respective left-side radial edge portion and a respective right-side radial edge portion. In one or more examples, the angle 162 is about 105°. In this context, "about 105°" includes 105° plus or minus 4°, inclusive.

Left-side radial edge portion 134 is defined by or along boundaries of an angle 164 having an apex at center axis 101 of the target 110, and right-side radial edge portion 136 is defined by or along boundaries of an angle 166 having an apex at center axis 101 of the target 110. In one or more examples, angles 164 and 166 are respectively about 15°. In this context, "about 15°" includes 5° plus or minus 1°, inclusive.

Respective arc band-shaped rings of fins 114 are radially spaced from an adjacent arc band-shaped ring (i.e., edge to edge) by an angular spacing 168. In one or more examples, the angular spacing 168 is about 45°. In this context, "about 45°" includes 45° plus or minus 3°, inclusive.

Given the above, in one or more examples, adjacent "radial edge fins" of target 110 are separated from each other by about 45°, i.e., for adjacent arc-band shaped rings, and about 135°, i.e., for radial edge fins of a respective arc-band shaped ring.

Table 1 below is a summary of the angle values associated with target 110 of FIGS. 1A-1C according to the one or more examples described above.

TABLE 1

Example Angle Values Associated With Target 110

| Angle Reference (FIG. 1C) | Example Angle Value |
| --- | --- |
| Angle 160 | 135° |
| Angle 162 | 105° |
| Angle 164, 166 | 15° |
| Angle 168 | 45° |

In one or more examples with reference back to FIG. 1A, the design of target 110 may substantially cover portions of excitation coil 102 and only nominally (e.g., minimally) cover sense coils 104. In one or more examples, the amount of coverage of sense coils 104 (or conversely, the amount of exposure of sense coils 104) may be limited to an amount suitable for specific operating conditions. Here, in one or more examples, respective outer-circumferential portions (e.g., outer-circumferential portion 130 of FIG. 1B) of fins 114 may substantially cover a portion of excitation coil 102 that is under, or over, the respective outer-circumferential portion (e.g., without covering portions of sense coils 104). Further, in one or more examples, respective fins 114 formed as the arc band-shaped ring have an arc band-shaped opening (e.g., arc band-shaped opening 138 of FIG. 1B) to substantially expose sense coils 104 that are under, or over, the respective fin. Even further, in one or more examples, the left-side and the right-side radial edge portions (e.g., left-side and the right-side radial edge portions 134 and 136 of FIG. 1B) are respectively made relatively narrow so as not to (substantially) cover sense coils 104 that are under, or over, the respective radial edge portion. In one or more particular examples, the left-side and the right-side radial edge portions are respectively defined by boundaries of an angle which is about 15° or less (e.g., relatively narrow so as not to substantially cover sense coils 104).

Figure 2A:
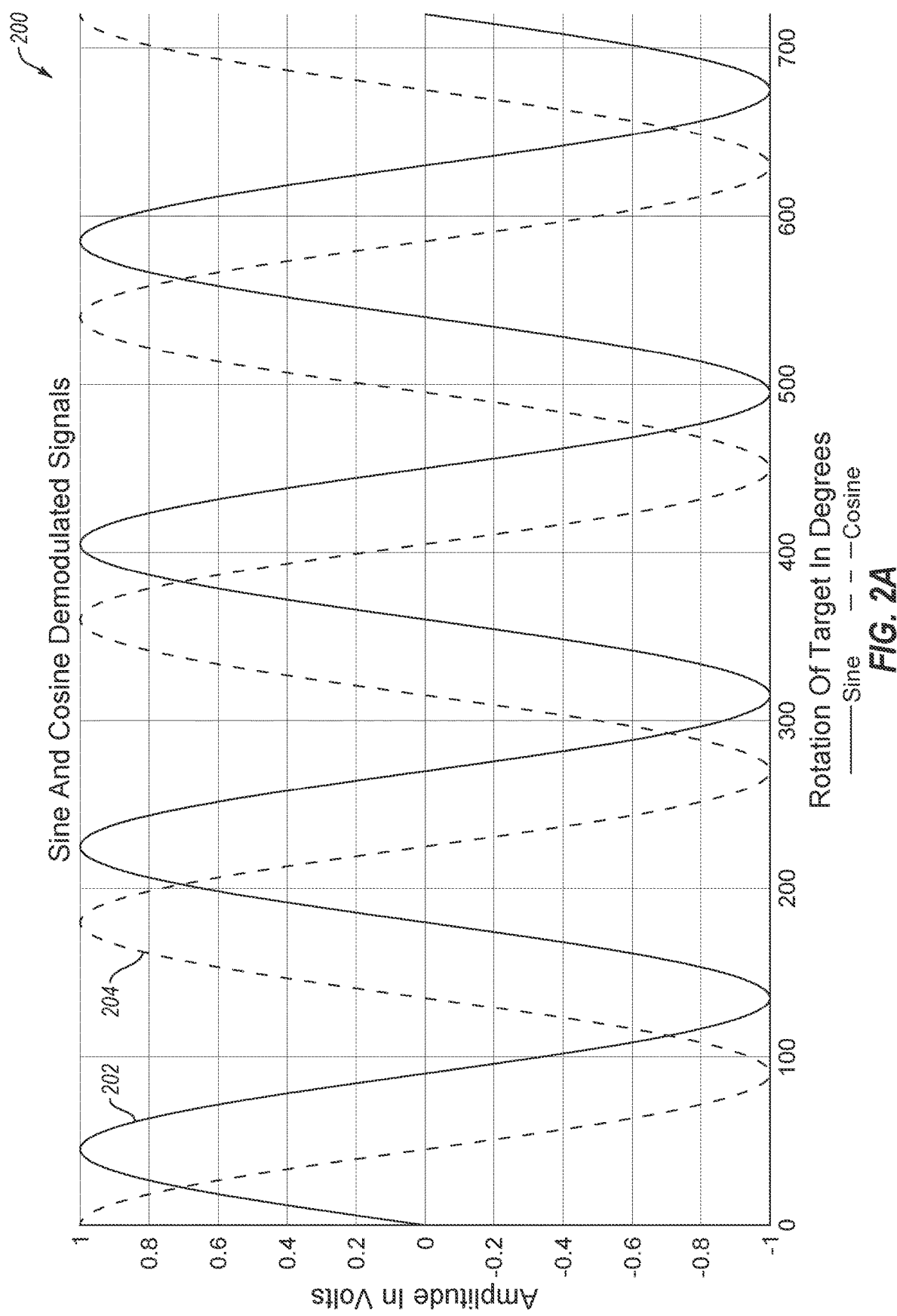
FIG. 2A is a graph of sense signal voltages versus angular target position for the apparatus of FIG. 1A according to one or more examples.

FIG. 2A is a graph 200 of sense signal voltage versus angular target position for apparatus 100 of FIG. 1A according to one or more examples. Sense coils 104, at least partially responsive to current flowing through excitation coil 102, produce a signal proportional to a radial position of target 110 around center axis 101. Here, graph 200 shows the voltages of a sine sense signal 202 and a cosine sense signal 204 demodulated from sense coils 104 over 720° of rotation of the target body. As the inductive position sensor of FIG. 1A is two-pole pair sensor, there are four (4) cycles of sensor output over the 720° of rotation of the target (i.e., two (2) cycles of sensor output over one (1) full rotation or 360° of the target).

Figure 2B:
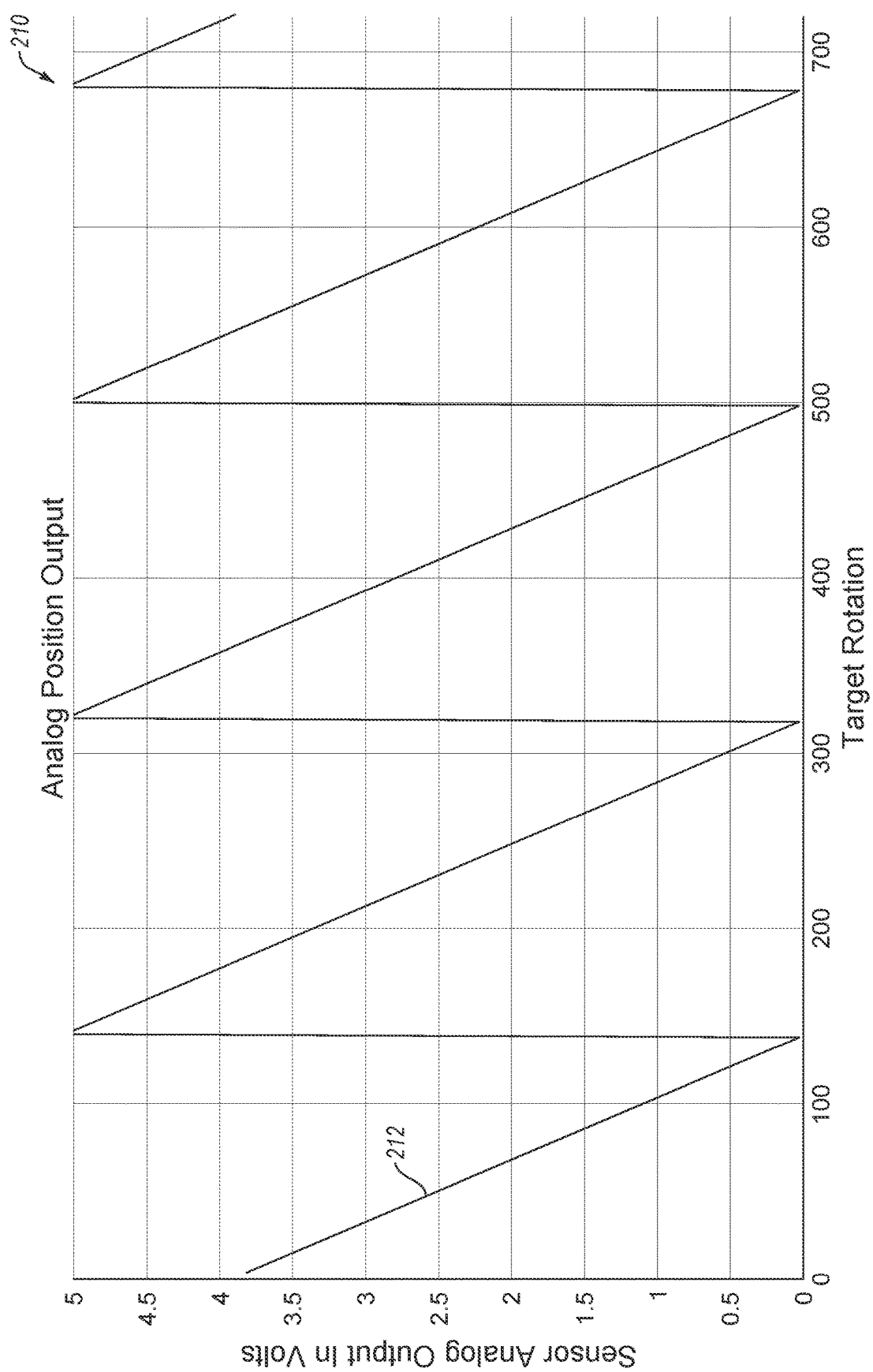
FIG. 2B is a graph of an analog position output versus angular target position for the apparatus of FIG. 1A according to one or more examples.

FIG. 2B is a graph 210 of an analog position output versus angular target position for apparatus 100 of FIG. 1A according to one or more examples. A sensor output signal 212 is generated based on a relationship (e.g., arctangent) between sine and cosine sense signals 202 and 204 of FIG. 2A. As shown, sensor output signal 212 has a constant-slope and varies linearly between 0-5 volts every 180°.

Figure 3A:
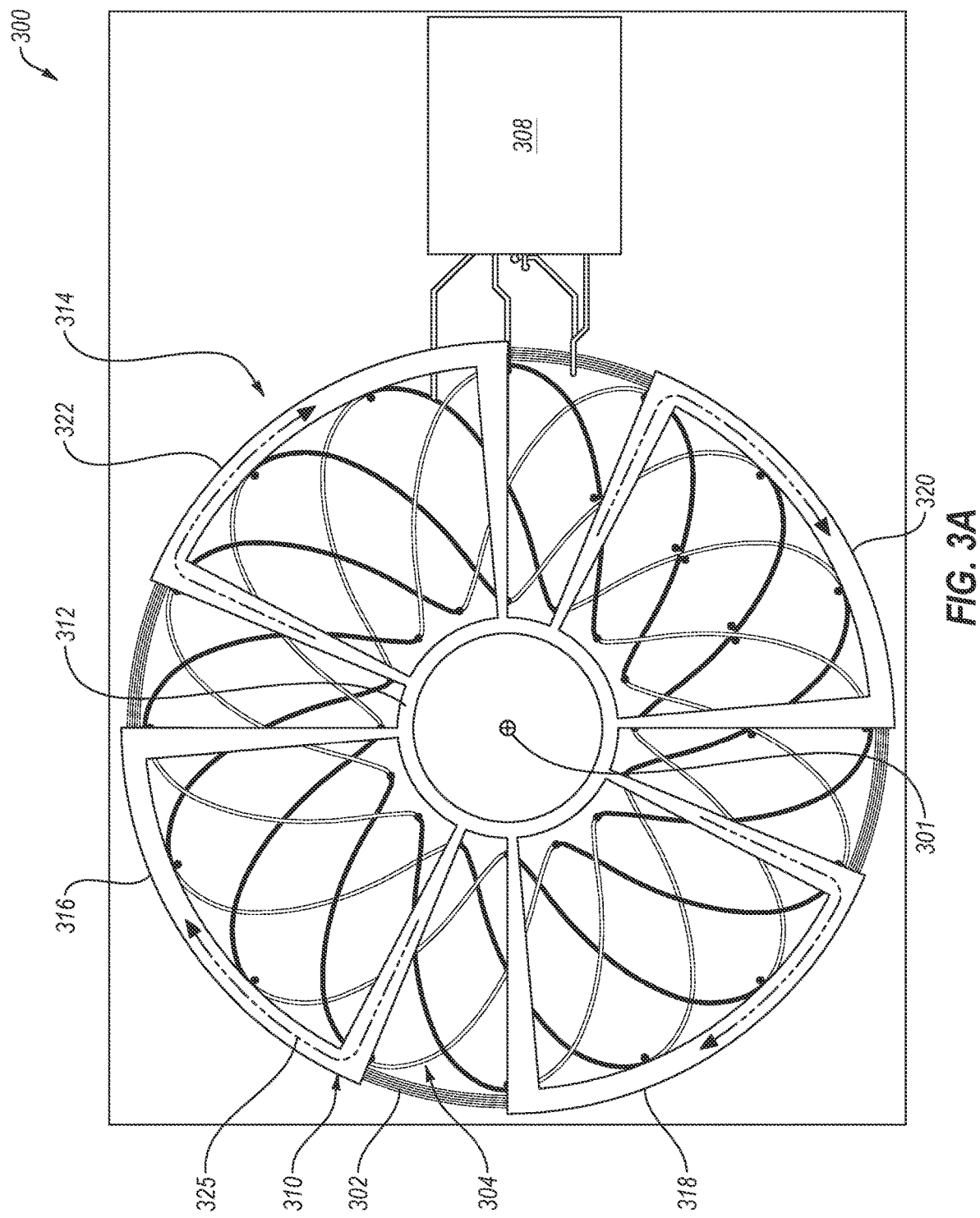
FIG. 3A is a top view of an apparatus which may be, or include, an inductive position sensor according to one or more examples.

FIG. 3A is a top view of an apparatus 300 according to one or more examples. Apparatus 300 may be, or include, an inductive angular-position sensor. Apparatus 300 may include an excitation coil 302, sense coils 304, and a target 310. Excitation coil 302 and sense coils 304 may be laid out as conductive traces on a support structure, or a substrate 306, such as a PCB. Apparatus 300 may also include processing circuitry 308 for inductive position sensing of target 310 using excitation coil 302 and sense coils 304. At least some of processing circuitry 308 may be packaged in an integrated circuit.

Excitation coil 302 may be referred to as a primary coil or an oscillator coil, and sense coils 304 may be referred to as secondary coils. Sense coils 304 may include respective radially symmetric lobes evenly arranged around a center axis 301. Excitation coil 302 may have a circular winding pattern arranged around center axis 301 and around sense coils 304. In one or more examples, respective lobes of sense coils 304 have a sinusoidal lobe shape as shown in FIG. 3A; however, any suitable lobe shape may be implemented as an alternative.

Target 310 has a target body which is generally planar (i.e., in-plane with the page). The target body of target 310 may be made of a conductive material, such as a non-magnetic conductive metal or metal alloy, without limitation. In one or more examples, the non-magnetic conductive metal or metal alloy may be or include copper or aluminum. In one or more other examples, the target body of target 310 may be made of a magnetic conductive metal or metal alloy, such as carbon steel or ferritic stainless steel, without limitation. Here, the oscillator may generate an excitation signal within a certain range of frequencies (e.g., 1-6 MHz, without limitation) that the magnetic domains of the magnetic conductive metals or metal alloys will not react to.

When in operational use, target 310 rotates around center axis 301. Target 310 may disrupt magnetic coupling between excitation coil 302 and sense coils 304, such that sense signals induced in sense coils 304 are indicative of an angular-position of target 310 as it rotates around center axis 301. The degree to which target 310 disrupts magnetic coupling between excitation coil 302 and sense coils 304 may vary at least partially in response to changes in the angular-position of target 310.

In one or more examples, the generally planar body of target 310 has an inner circular ring 312 around center axis, and multiple fins 314 (e.g., fins 316, 318, 320, and 322) formed with and extending radially from portions of inner circular ring 312 and equally radially spaced around center axis 301. In one or more examples of FIG. 3A, the number of fins 314 of the target body is four (4). In one or more examples, fins 316, 318, 320, and 322 are equally radially spaced around inner circular ring 312, and about center axis 301, at 90° intervals.

Figure 3C:
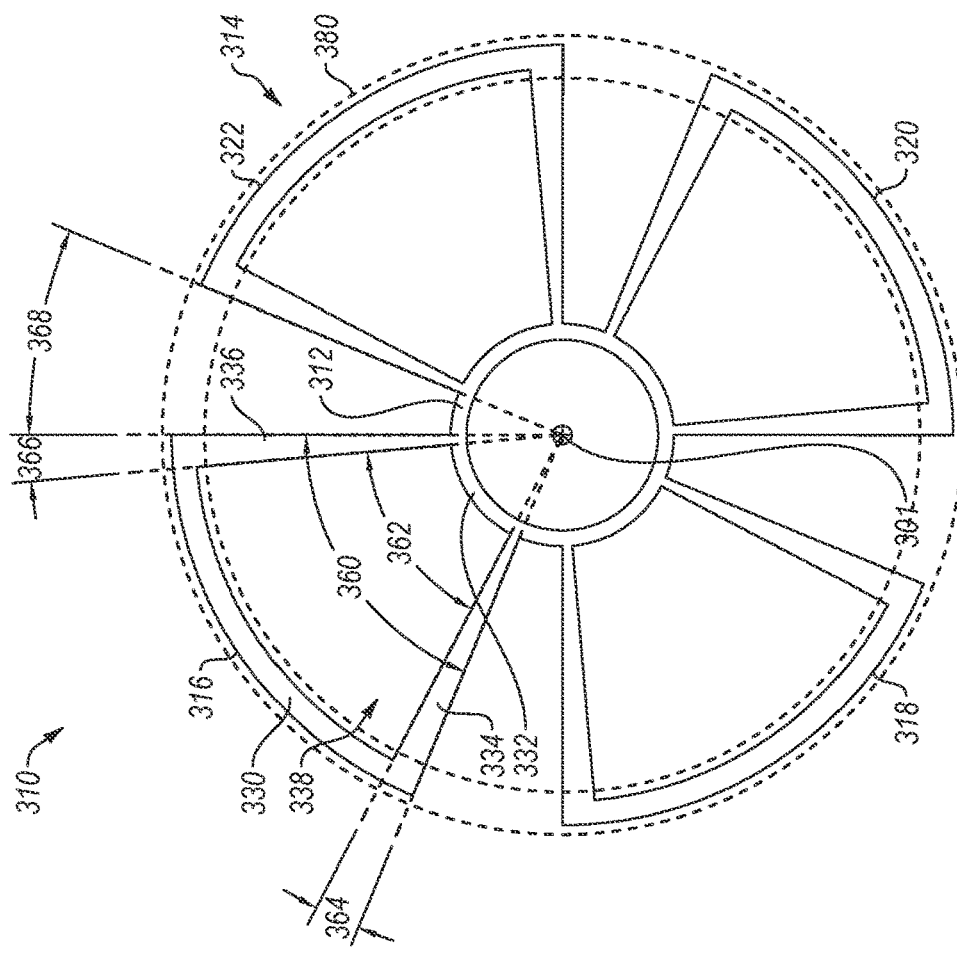
FIGS. 3B and 3C are depictions of a target of the apparatus of FIG. 3A according to one or more examples.
Figure 3B:
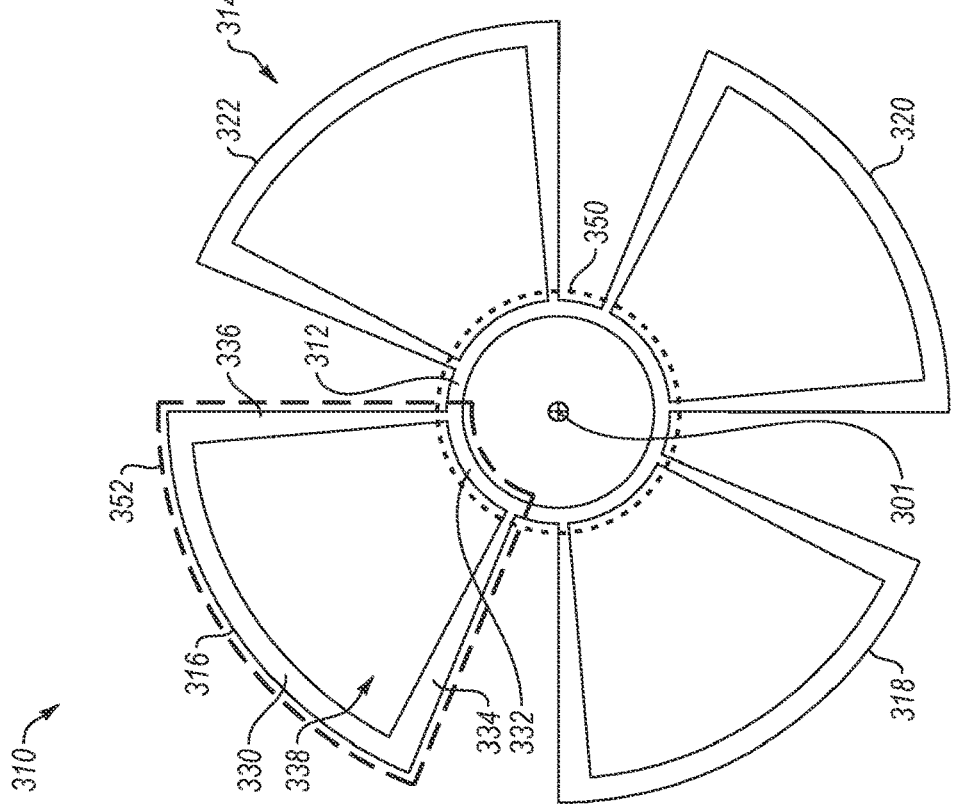

FIGS. 3B and 3C depict target 310 of FIG. 3A separated from the rest of angular-position sensor. As illustrated, respective ones of fins 314 are formed as a semi-circular, arc band-shaped ring (i.e., together with its respective portion of inner circular ring 112). Again, an arc band-shaped ring may be characterized as a semi-circular, arc band having a semi-circular, arc band-shaped opening 338 or "cut-out." In FIG. 3B, a dashed line outline 352 surrounding fin 316 is provided to designate fin 316 formed as the arc band-shaped ring. A dotted line outline 350 surrounding inner circular ring 312 is provided to designate inner circular ring 312, a portion of which is formed with the arc band-shaped ring of fin 316.

In FIG. 3B, respective fins 314 formed as the arc band-shaped ring have an outer-circumferential portion and an inner-circumferential portion, where the inner-circumferential portion is formed as part of inner circular ring 312. For example, fin 316 has an outer-circumferential portion 330 and an inner-circumferential portion 332, where inner-circumferential portion 332 is formed as part of inner circular ring 312. As respective fins 314 are formed as an arc band-shaped ring, consequently, respective ones of the outer-circumferential portions have the shape of a semicircular arc band, and respective ones of the inner-circumferential portions (e.g., portions of inner circular ring 312) have the shape of a (relatively shorter) semi-circular arc band.

In addition, respective fins 314 formed as the arc band-shaped ring have a respective left-side radial edge portion and a right-side radial edge portion, where the left-side and right-side radial edge portions connect between or bridge the respective inner-circumferential portion and the respective outer-circumferential portion. For example, fin 316 has a left-side radial edge portion 334 and a right-side radial edge portion 336, where left-side and right-side radial edge portions 334 and 336 connect between or bridge inner-circumferential portion 332 and outer-circumferential portion 330.

Left-side and right-side radial edge portions 334 and 336 may be characterized as (e.g., relatively narrow) "radial edge fins" which extend from inner circular ring 312 and connect with outer-circumferential portion 330. In total, the total number of radial edge fins of target 310 of FIG. 3B is eight (8) (e.g., 2 radial edge fins per fin, with 4 fins=8 radial edge fins).

Given such a configuration, respective fins 314 formed as the arc band-shaped rings respectively form a loop to provide a current path for an eddy current for angular-position sensing. With reference back to FIG. 3A, fin 316 is indicated to provide a current path 325 for eddy current, and the remaining fins are likewise indicated.

With reference to FIG. 3C, the outer-circumferential portions of fins 314 that are equally radially spaced around inner circular ring 312 together define a discontinuous outer circular ring 380. In one or more examples, the outer-circumferential portions of the fins 314 together define discontinuous outer circular ring 380 which is about 75% of a full outer circular ring (or about 270° out of) 360°. In this context, "about 75%" includes 75% plus or minus 3%, inclusive.

Respective arc band-shaped rings of multiple fins 314 are defined by or along boundaries of an angle 360 having an apex at center axis 301 of the target 310. In one or more examples, the angle 360 is about 67.5°. In this context, "about 67.5°" includes 67.5° plus or minus 3°, inclusive.

In addition, respective arc band-shaped openings (e.g., arc band-shaped opening 338) in fins 314 are defined by or along boundaries of an angle 362 having an apex at center axis 301 of the target 310, bordered by a respective left-side radial edge portion and a respective right-side radial edge portion. In one or more examples, the angle 362 is about 57.5°. In this context, "about 57.5°" includes 57.5° plus or minus 3°, inclusive.

Left-side radial edge portion 334 is defined by or along boundaries of an angle 364 having an apex at center axis 301 of the target 310, and right-side radial edge portion 336 is defined by or along boundaries of an angle 366 having an apex at center axis 301 of the target 310. In one or more examples, angles 364 and 366 are respectively about 5°. In this context, "about 5°" includes 5° plus or minus 1°, inclusive.

Respective arc band-shaped rings of fins 314 are radially spaced from an adjacent arc band-shaped ring (i.e., edge to edge) by an angular spacing 368. In one or more examples, the angular spacing 368 is about 22.5°. In this context, "about 22.5°" includes 22.5° plus or minus 2°, inclusive.

Given the above, in one or more examples, adjacent "radial edge fins" of target 310 are separated from each other by about 22.5°, i.e., for adjacent arc-band shaped rings, and about 67.5°, i.e., for radial edge fins of a respective arc-band shaped ring.

Table 2 below is a summary of the angle values associated with target 310 of FIGS. 3A-3C according to the one or more examples described above.

TABLE 2

Example Angle Values Associated With Target 310

| Angle Reference (FIG. 3C) | Example Angle Value |
| --- | --- |
| Angle 360 | 67.5° |
| Angle 362 | 57.5° |
| Angle 364, 366 | 5° |
| Angle 368 | 22.5° |

In one or more examples with reference back to FIG. 3A, the design of target 310 may substantially cover portions of excitation coil 302 and only nominally (e.g., minimally) cover sense coils 304. In one or more examples, the amount of coverage of sense coils 304 (or conversely, the amount of exposure of sense coils 304) may be limited to an amount suitable for specific operating conditions. Here, in one or more examples, respective outer-circumferential portions (e.g., outer-circumferential portion 330 of FIG. 3B) of the fins 314 may substantially cover a portion of excitation coil 302 that is under, or over, the respective outer-circumferential portion (e.g., without covering portions of sense coils 304). Further, in one or more examples, respective fins 314 formed as the arc band-shaped ring have an arc band-shaped opening (e.g., arc band-shaped opening 338 of FIG. 3B) to substantially expose sense coils 304 that are under, or over, the respective fin. Even further, in one or more examples, the left-side and the right-side radial edge portions (e.g., left-side and the right-side radial edge portions 334 and 336 of FIG. 3B) are respectively made relatively narrow so as not to (substantially) cover sense coils 304 that are under, or over, the respective radial edge portion. In one or more particular examples, the left-side and the right-side radial edge portions are respectively defined by boundaries of an angle which is about 5° or less (e.g., relatively narrow so as not to substantially cover sense coils 304).

Figure 4A:
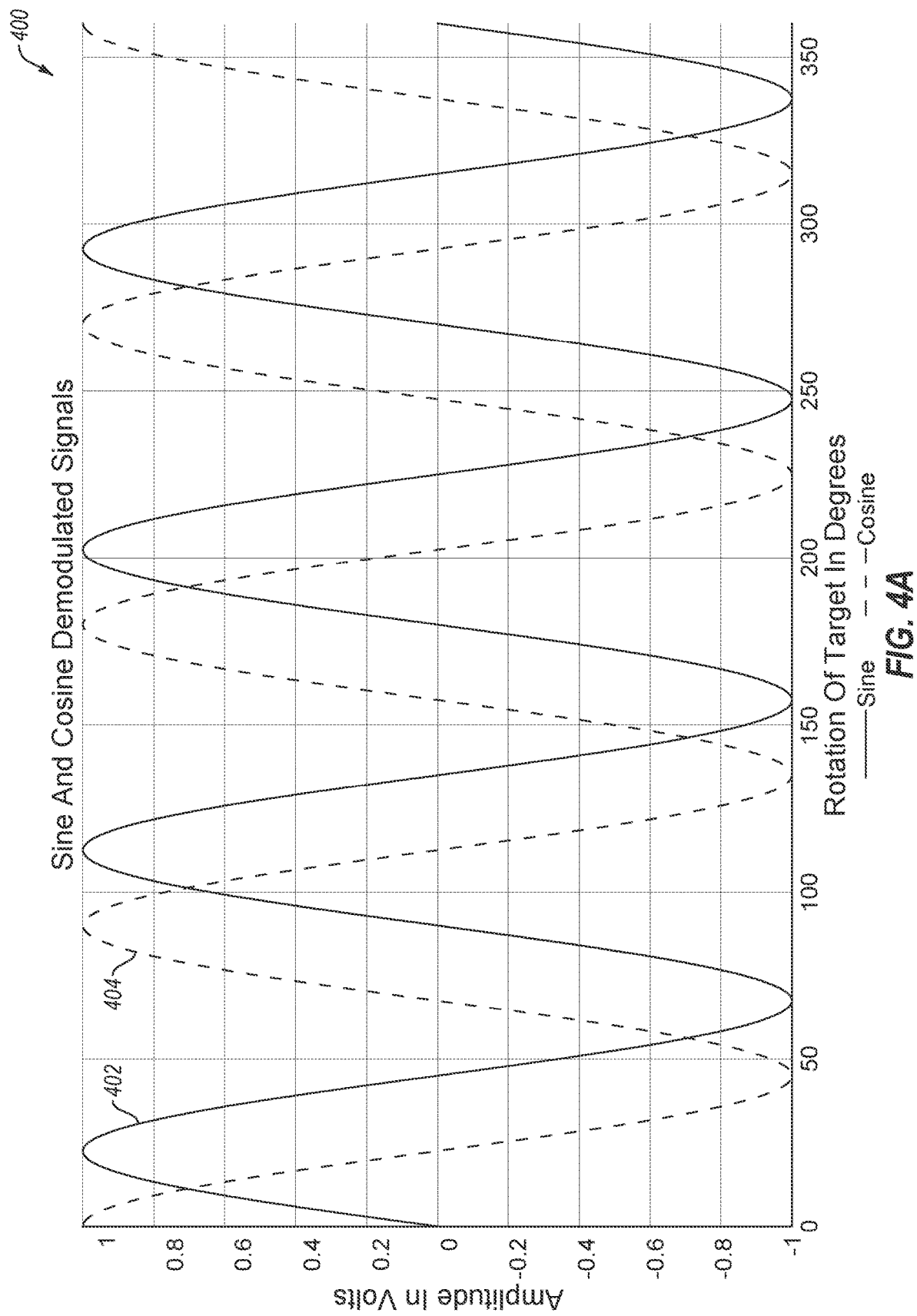
FIG. 4A is a graph of sense signal voltages versus angular target position for the apparatus of FIG. 3A according to one or more examples.

FIG. 4A is a graph 400 of sense signal voltage versus angular target position for apparatus 300 of FIG. 3A according to one or more examples. Sense coils 304, at least partially responsive to current flowing through excitation coil 302, produce a signal proportional to a radial position of target 310 around center axis 301. Here, graph 400 shows the voltages of a sine sense signal 402 and a cosine sense signal 404 demodulated from the sense coils over 360° of rotation of the target body. As the inductive position sensor of FIG. 3A is four-pole pair sensor, there are four (4) cycles of sensor output over one (1) full rotation (i.e., 360°) of the target.

Figure 4B:
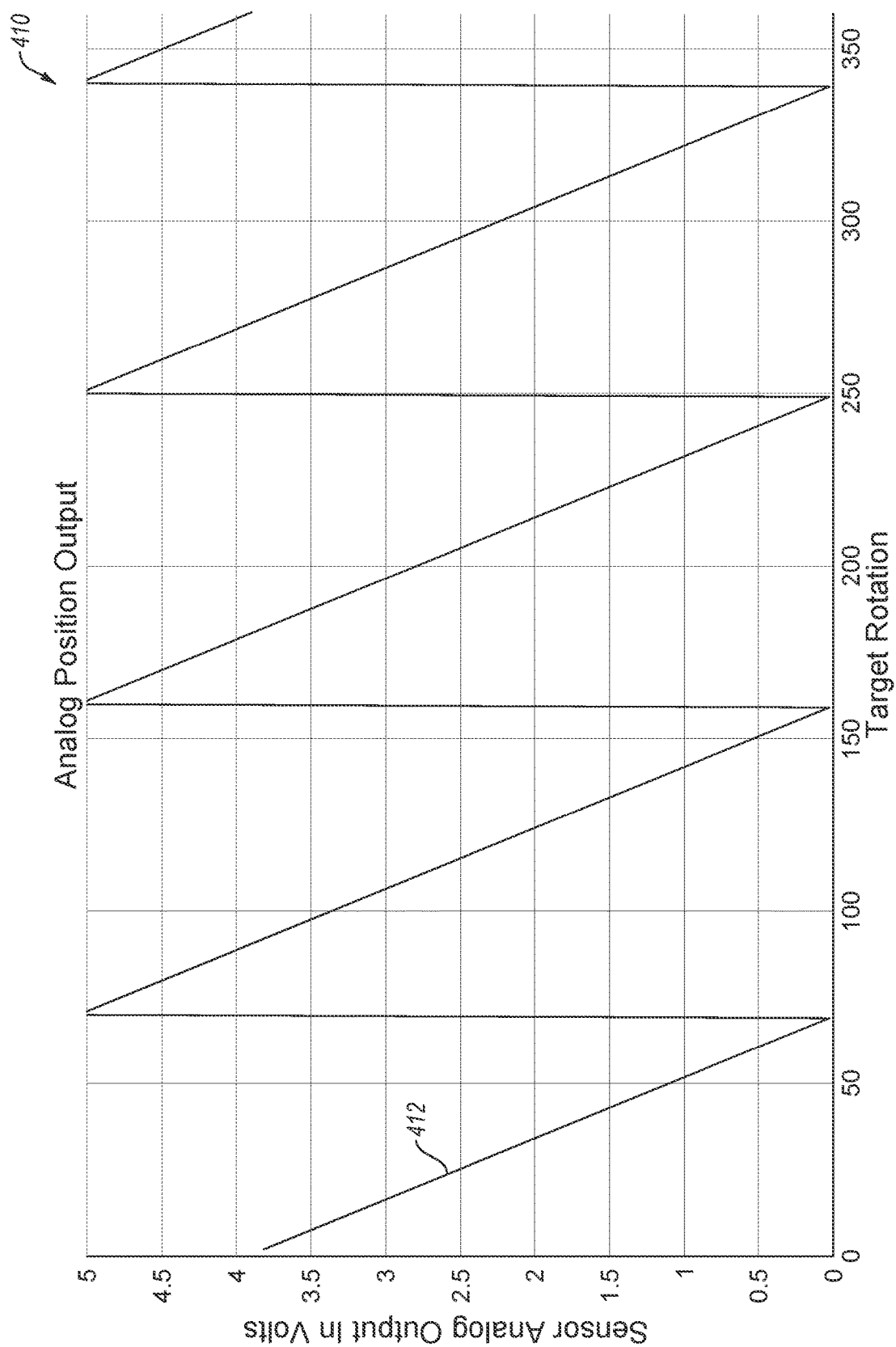
FIG. 4B is a graph of an analog position output versus angular target position for the apparatus of FIG. 3A according to one or more examples.

FIG. 4B is a graph 410 of an analog position output versus angular target position for apparatus 300 of FIG. 3A according to one or more examples. A sensor output signal 412 is generated based on a relationship (e.g., arctangent) between sine and cosine sense signals 402 and 404 of FIG. 4A. As shown, sensor output signal 412 has a constant slope and varies linearly between 0-5 volts every 90°.

Figure 5:
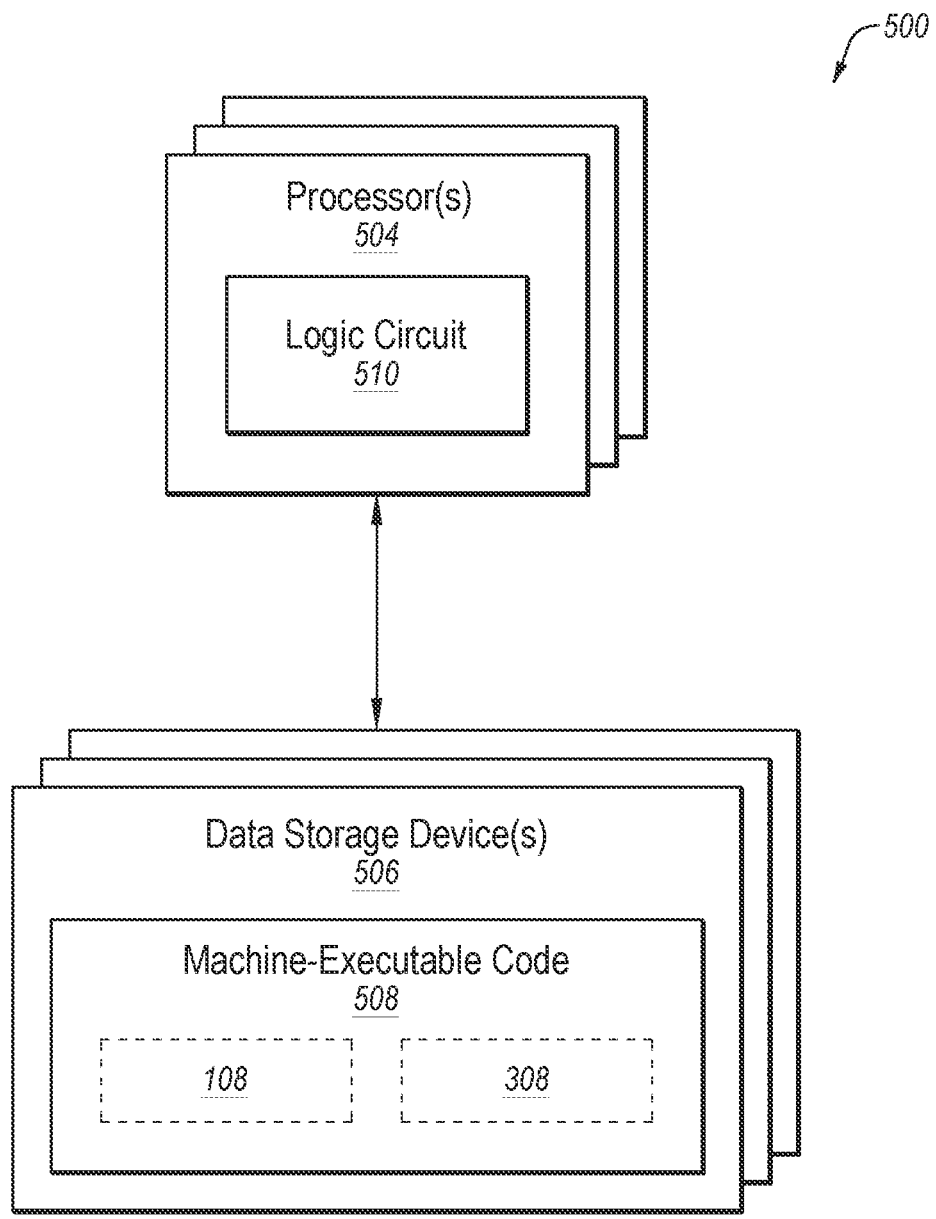
FIG. 5 illustrates a block diagram of a device that may be used to implement various functions, operations, acts, processes, or methods, according to one or more examples.

FIG. 5 is a block diagram of a device 500 that, in one or more examples, may be used to implement various functions, operations, acts, processes, or methods disclosed herein. Device 500 includes one or more processors 504 (sometimes referred to herein as "processors 504") operably coupled to one or more apparatuses such as data storage devices (sometimes referred to herein as "storage 506"), without limitation. Storage 506 includes machine-executable code 508 stored thereon (e.g., stored on a computer-readable memory, without limitation) and processors 504 include logic circuitry 510. Machine-executable code 508 include information describing functional elements that may be implemented by (e.g., performed by) logic circuitry 510. Logic circuitry 510 implements (e.g., performs) the functional elements described by machine-executable code 508. Device 500, when executing the functional elements described by machine-executable code 508, should be considered as special purpose hardware may carry out the functional elements disclosed herein. In one or more examples, processors 504 may perform the functional elements described by machine-executable code 508 sequentially, concurrently (e.g., on one or more different hardware platforms), or in one or more parallel process streams.

When implemented by logic circuitry 510 of processors 504, machine-executable code 508 may adapt processors 504 to perform operations of examples disclosed herein. For example, machine-executable code 508 may adapt processors 504 to perform at least a portion or a totality of the operations discussed in relation to apparatus 100 of FIG. 1A and apparatus 300 of FIG. 3A, and more specifically, one or more operations of FIG. 1A (e.g., operations performed by processing circuitry 108 of FIG. 1A) and one or more of operations of FIG. 3A (e.g., operations performed by processing circuitry 308 of FIG. 3A), without limitation.

Processors 504 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer executes computing instructions (e.g., software code, without limitation) related to examples. It is noted that a general-purpose processor (may also be referred to herein as a host processor or simply a host) may be a microprocessor, but in the alternative, processors 504 may include any conventional processor, controller, microcontroller, or state machine. Processors 504 may also be implemented as a combination of computing devices, such as a combination of a DSP and a microprocessor, a plurality of microprocessors, one or more microprocessors in conjunction with a DSP core, or any other such configuration.

In one or more examples, storage 506 includes volatile data storage (e.g., random-access memory (RAM), without limitation), non-volatile data storage (e.g., Flash memory, a hard disc drive, a solid-state drive, erasable programmable read-only memory (EPROM), without limitation). In one or more examples processors 504 and storage 506 may be implemented into a single device (e.g., a semiconductor device product, a system on chip (SOC), without limitation). In one or more examples processors 504 and storage 506 may be implemented into separate devices.

In one or more examples, machine-executable code 508 may include computer-readable instructions (e.g., software code, firmware code, without limitation). By way of non-limiting example, the computer-readable instructions may be stored by storage 506, accessed directly by processors 504, and executed by processors 504 using at least logic circuitry 510. Also, by way of non-limiting example, the computer-readable instructions may be stored on storage 506, transmitted to a memory device (not shown) for execution, and executed by processors 504 using at least logic circuitry 510. Accordingly, in one or more examples logic circuitry 510 includes electrically configurable logic circuitry.

In one or more examples, machine-executable code 508 may describe hardware (e.g., circuitry, without limitation) to be implemented in logic circuitry 510 to perform the functional elements. This hardware may be described at any of a variety of levels of abstraction, from low-level transistor layouts to high-level description languages. At a high-level of abstraction, a hardware description language (HDL) such as an Institute of Electrical and Electronics Engineers (IEEE) Standard hardware description language (HDL) may be used, without limitation. By way of non-limiting examples, Verilog™, System Verilog™ or very large-scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of logic circuitry 510 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in one or more examples machine-executable code 508 may include an HDL, an RTL, a GL description, a mask level description, other hardware description, or any combination thereof.

In examples where machine-executable code 508 includes a hardware description (at any level of abstraction), a system (not shown, but including storage 506) may implement the hardware description described by machine-executable code 508. By way of non-limiting example, processors 504 may include a programmable logic device (e.g., an FPGA or a PLC, without limitation) and the logic circuitry 510 may be electrically controlled to implement circuitry corresponding to the hardware description into logic circuitry 510. Also, by way of non-limiting example, logic circuitry 510 may include hard-wired logic manufactured by a manufacturing system (not shown, but including storage 506) according to the hardware description of machine-executable code 508.

Regardless of whether machine-executable code 508 includes computer-readable instructions or a hardware description, logic circuitry 510 performs the functional elements described by machine-executable code 508 when implementing the functional elements of machine-executable code 508. It is noted that although a hardware description may not directly describe functional elements, a hardware description indirectly describes functional elements that the hardware elements described by the hardware description are capable of performing.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used in the present disclosure, the terms "module" or "component" may refer to specific hardware implementations may perform the actions of the module or component or software objects or software routines that may be stored on or executed by general purpose hardware (e.g., computer-readable media, processing devices, without limitation) of the computing system. In one or more examples, the different components, modules, engines, and services described in the present disclosure may be implemented as objects or processes that execute on the computing system (e.g., as separate threads, without limitation). While some of the system and methods described in the present disclosure are generally described as being implemented in software (stored on or executed by general purpose hardware), specific hardware implementations or a combination of software and specific hardware implementations are also possible and contemplated.

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," without limitation). As used herein, "each" means "some or a totality." As used herein, "each and every" means "a totality."

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" or "an" means "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, without limitation" or "one or more of A, B, and C, without limitation." is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional specific non-limiting examples may include:

Example 1: An apparatus comprising: a target for inductive angular-position sensing, the target having a target body comprising: an inner circular ring around a center axis; and multiple fins formed with and extending radially from portions of the inner circular ring and equally radially spaced around the center axis, wherein respective ones of the multiple fins are formed as an arc band-shaped ring.

Example 2: The apparatus according to Example 1, wherein the respective ones of the multiple fins formed as the arc band-shaped ring comprise an outer-circumferential portion and an inner-circumferential portion, the inner-circumferential portion formed as part of the inner circular ring.

Example 3: The apparatus according to any of Examples 1 and 2, wherein the outer-circumferential portions of the multiple fins together define a discontinuous outer circular ring.

Example 4: The apparatus according to any of Examples 1 through 3, wherein the discontinuous outer circular ring is about 75% of a full outer circular ring.

Example 5: The apparatus of according to any of Examples 1 through 4, wherein the number of the multiple fins is equal to two.

Example 6: The apparatus according to any of Examples 1 through 5, wherein the arc band-shaped ring of the respective ones of the multiple fins is defined by boundaries of an angle having an apex at a center axis of the target, the angle being about 135°.

Example 7: The apparatus according to any of Examples 1 through 6, wherein the arc band-shaped ring of the respective ones of the multiple fins is radially spaced from an adjacent arc band-shaped ring by an angular spacing of about 45°.

Example 8: The apparatus according to any of Examples 1 through 7, wherein the number of the multiple fins is equal to four.

Example 9: The apparatus according to any of Examples 1 through 8, wherein the arc band-shaped ring of the respective ones of the multiple fins is defined by boundaries of an angle having an apex at a center axis of the target, the angle being about 67.5°.

Example 10: The apparatus according to any of Examples 1 through 9, wherein the arc band-shaped ring of the multiple fins is radially spaced from an adjacent arc band-shaped ring by an angular spacing of about 22.5°.

Example 11: The apparatus according to any of Examples 1 through 10, wherein the respective ones of the multiple fins formed as the arc band-shaped ring provide a current path for an eddy current for the inductive angular-position sensing.

Example 12: An apparatus comprising: sense coils comprising radially symmetric lobes evenly arranged around a center axis; an excitation coil having a circular winding pattern arranged around the sense coils; a target to rotate around the center axis, the target having a target body comprising: an inner circular ring around a center axis; and multiple fins formed with and extending radially from portions of the inner circular ring and equally radially spaced around the center axis, wherein respective ones of the multiple fins are formed as an arc band-shaped ring.

Example 13: The apparatus according to Example 12, wherein the respective ones of the multiple fins formed as the arc band-shaped ring comprise an outer-circumferential portion and an inner-circumferential portion, the inner-circumferential portion formed as part of the inner circular ring, the respective ones of the outer-circumferential portions of the multiple fins to substantially cover a portion of the excitation coil.

Example 14: The apparatus according to any of Examples 12 and 13, wherein the respective ones of the multiple fins formed as the arc band-shaped ring have an arc band-shaped opening to substantially expose the sense coils that are under, or over, the respective fin.

Example 15: The apparatus according to any of Examples 12 through 14, wherein the outer-circumferential portions of the multiple fins together define a discontinuous outer circular ring to cover about 75° of the excitation coil.

Example 16: The apparatus according to any of Examples 12 through 15, wherein the number of the multiple fins is equal to two.

Example 17: The apparatus according to any of Examples 12 through 16, wherein the arc band-shaped ring of the multiple fins is defined by boundaries of an angle having an apex at a center axis of the target, the angle being about 135°.

Example 18: The apparatus according to any of Examples 12 through 17, wherein the respective ones of the multiple fins formed as the arc band-shaped ring include a left-side radial edge portion and a right-side radial edge portion, the respective ones of the left-side radial edge portion and the right-side radial edge portion defined by boundaries of an angle having an apex at a center axis of the target, the angle being between about 15° or less.

Example 19: The apparatus according to any of Examples 12 through 18, wherein the number of the multiple fins is equal to four.

Example 20: The apparatus according to any of Examples 12 through 19, wherein the arc band-shaped ring of the multiple fins is defined by boundaries of an angle having an apex at a center axis of the target, the angle being about 67.5°.

Example 21: The apparatus according to any of Examples 12 through 20, wherein the respective ones of the multiple fins formed as the arc band-shaped ring include a left-side radial edge portion and a right-side radial edge portion, the respective ones of the left-side radial edge portion and the right-side radial edge portion defined by boundaries of an angle having an apex at a center axis of the target, the angle being between about 5° or less.

Example 22: The apparatus according to any of Examples 12 through 21, wherein the sense coils, at least partially responsive to current flowing through the excitation coil, produce a signal proportional to a radial position of the target body around the center axis.

Example 23: The apparatus according to any of Examples 12 through 22, wherein the respective ones of the multiple fins formed as the arc band-shaped ring provide a current path for an eddy current for inductive angular-position sensing.

Example 24: An apparatus comprising: sense coils comprising radially symmetric lobes evenly arranged around a center axis; an excitation coil having a circular winding pattern arranged around the sense coils; a target to rotate around the center axis, the target having a target body comprising: an inner circular ring around a center axis; multiple fins formed with and extending radially from portions of the inner circular ring and equally radially spaced around the center axis, respective ones of the multiple fins formed as an arc band-shaped ring and having an arc band-shaped opening to substantially expose the sense coils that are under, or over, the respective fin; the respective ones of the multiple fins formed as the arc band-shaped ring having an outer-circumferential portion and an inner-circumferential portion, the inner-circumferential portion formed as part of the inner circular ring; and respective ones of the outer-circumferential portions of the multiple fins to substantially cover a portion of the excitation coil that is under, or over, the respective outer-circumferential portion.

Example 25: The apparatus according to Example 24, wherein the respective ones of the multiple fins formed as the arc band-shaped ring include a left-side radial edge portion and a right-side radial edge portion, the respective ones of the left-side radial edge portion and the right-side radial edge portion defined by boundaries of an angle having an apex at a center axis of the target, the angle being between about 15° or less.

Example 26: The apparatus according to any of Examples 24 and 25, wherein the sense coils, at least partially responsive to current flowing through the excitation coil, produce a signal proportional to a radial position of the target body around the center axis.

Example 27: The apparatus according to any of Examples 24 through 26, wherein the respective ones of the multiple fins formed as the arc band-shaped ring provide a current path for an eddy current for inductive angular-position sensing.

Example 28: The apparatus according to any of Examples 24 through 27, wherein the target body is made of a non-magnetic or magnetic conductive metal or metal alloy.

While the present disclosure has been with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus comprising:
a target for inductive angular-position sensing, the target having a target body comprising:
an inner circular ring around a center axis; and
multiple fins formed with and extending radially from portions of the inner circular ring and equally radially spaced around the center axis,
wherein respective ones of the multiple fins are formed as an arc band-shaped ring,
wherein the respective ones of the multiple fins formed as the arc band-shaped ring comprise an outer-circumferential portion and an inner-circumferential portion,
wherein respective inner-circumferential portions of the multiple fins are formed as part of the inner circular ring, and
wherein the outer-circumferential portions of the multiple fins together define a discontinuous outer circular ring.

2. The apparatus of claim 1, wherein the target body is made of a non-magnetic conductive metal or metal alloy.

3. The apparatus of claim 1, wherein the target body is made of a magnetic conductive metal or metal alloy.

4. The apparatus of claim 1, wherein the discontinuous outer circular ring is about 75% of a full outer circular ring.

5. The apparatus of claim 1, wherein the number of the multiple fins is equal to two.

6. The apparatus of claim 5, wherein the arc band-shaped ring of the respective ones of the multiple fins is defined by boundaries of an angle having an apex at the center axis, the angle being about 135°.

7. The apparatus of claim 6, wherein the arc band-shaped ring of the respective ones of the multiple fins is radially spaced from an adjacent arc band-shaped ring by an angular spacing of about 45°.

8. The apparatus of claim 1, wherein the number of the multiple fins is equal to four.

9. The apparatus of claim 8, wherein the arc band-shaped ring of the respective ones of the multiple fins is defined by boundaries of an angle having an apex at the center axis, the angle being about 67.5°.

10. The apparatus of claim 9, wherein the arc band-shaped ring of the multiple fins is radially spaced from an adjacent arc band-shaped ring by an angular spacing of about 22.5°.

11. The apparatus of claim 1, wherein the respective ones of the multiple fins formed as the arc band-shaped ring provide a current path for an eddy current for the inductive angular-position sensing.

12. An apparatus comprising:
sense coils comprising radially symmetric lobes evenly arranged around a center axis;
an excitation coil having a circular winding pattern arranged around the sense coils;
a target to rotate around the center axis, the target having a target body comprising:
an inner circular ring around the center axis; and
multiple fins formed with and extending radially from portions of the inner circular ring and equally radially spaced around the center axis,
wherein respective ones of the multiple fins are formed as an arc band-shaped ring,
wherein the respective ones of the multiple fins formed as the arc band-shaped ring comprise an outer-circumferential portion and an inner-circumferential portion,
wherein respective inner-circumferential portions of the multiple fins are formed as part of the inner circular ring, and
wherein the outer-circumferential portions of the multiple fins together define a discontinuous outer circular ring.

13. The apparatus of claim 12, wherein respective ones of the outer-circumferential portions of the multiple fins substantially cover respective portions of the excitation coil.

14. The apparatus of claim 13, wherein the respective ones of the multiple fins formed as the arc band-shaped ring have an arc band-shaped opening to substantially expose the sense coils that are under, or over, the respective fin.

15. The apparatus of claim 12, wherein the outer-circumferential portions of the multiple fins together define the discontinuous outer circular ring to cover about 75° of the excitation coil.

16. The apparatus of claim 12, wherein the number of the multiple fins is equal to two.

17. The apparatus of claim 16, wherein the arc band-shaped ring of the multiple fins is defined by boundaries of an angle having an apex at the center axis, the angle being about 135°.

18. The apparatus of claim 14, wherein the respective ones of the multiple fins formed as the arc band-shaped ring include a left-side radial edge portion and a right-side radial edge portion, the respective ones of the left-side radial edge portion and the right-side radial edge portion defined by boundaries of an angle having an apex at the center axis, the angle being between about 15° or less.

19. The apparatus of claim 12, wherein the number of the multiple fins is equal to four.

20. The apparatus of claim 19, wherein the arc band-shaped ring of the multiple fins is defined by boundaries of an angle having an apex at the center axis, the angle being about 67.5°.

21. The apparatus of claim 14, wherein the respective ones of the multiple fins formed as the arc band-shaped ring include a left-side radial edge portion and a right-side radial edge portion, the respective ones of the left-side radial edge portion and the right-side radial edge portion defined by boundaries of an angle having an apex at the center axis, the angle being between about 5° or less.

22. The apparatus of claim 12, wherein the sense coils, at least partially responsive to current flowing through the excitation coil, produce a signal proportional to a radial position of the target body around the center axis.

23. The apparatus of claim 12, wherein the respective ones of the multiple fins formed as the arc band-shaped ring provide a current path for an eddy current for inductive angular-position sensing.

24. An apparatus comprising:
sense coils comprising radially symmetric lobes evenly arranged around a center axis;
an excitation coil having a circular winding pattern arranged around the sense coils;
a target to rotate around the center axis, the target having a target body comprising:
an inner circular ring around the center axis;
multiple fins formed with and extending radially from portions of the inner circular ring and equally radially spaced around the center axis,
respective ones of the multiple fins formed as an arc band-shaped ring, the respective ones of the multiple fins formed as the arc band-shaped ring having an arc band-shaped opening to substantially expose the sense coils that are under, or over, the respective fin;

the respective ones of the multiple fins formed as the arc band-shaped ring having an outer-circumferential portion and an inner-circumferential portion, respective inner-circumferential portions of the multiple fins formed as part of the inner circular ring, the outer-circumferential portions of the multiple fins together defining a discontinuous outer circular ring; and respective outer-circumferential portions of the multiple fins to substantially cover respective portions of the excitation coil that are under, or over, the respective outer-circumferential portions.

25. The apparatus of claim 24, wherein the respective ones of the multiple fins formed as the arc band-shaped ring include a left-side radial edge portion and a right-side radial edge portion, the respective ones of the left-side radial edge portion and the right-side radial edge portion defined by boundaries of an angle having an apex at the center axis, the angle being between about 15° or less.

26. The apparatus of claim 24, wherein the sense coils, at least partially responsive to current flowing through the excitation coil, produce a signal proportional to a radial position of the target body around the center axis.

27. The apparatus of claim 24, wherein the respective ones of the multiple fins formed as the arc band-shaped ring provide a current path for an eddy current for inductive angular-position sensing.

28. The apparatus of claim 24, wherein the target body is made of a non-magnetic or magnetic conductive metal or metal alloy.

* * * * *